US010757159B2

(12) United States Patent
Panguluri et al.

(10) Patent No.: US 10,757,159 B2
(45) Date of Patent: Aug. 25, 2020

(54) RETRIEVAL AND PLAYOUT OF MEDIA CONTENT

(71) Applicant: Gracenote Digital Ventures, LLC, New York, NY (US)

(72) Inventors: Venkatarama Anilkumar Panguluri, Milpitas, CA (US); John Zhenghao Yeh, Foster City, CA (US)

(73) Assignee: GRACENOTE DIGITAL VENTURES, LLC, New York, NY (US)

(*) Notice: Subject to any disclaimer, the term of this patent is extended or adjusted under 35 U.S.C. 154(b) by 579 days.

(21) Appl. No.: 14/341,521

(22) Filed: Jul. 25, 2014

(65) Prior Publication Data

US 2016/0028788 A1 Jan. 28, 2016

(51) Int. Cl.
*G06F 16/438* (2019.01)
*H04L 29/06* (2006.01)

(52) U.S. Cl.
CPC ........ *H04L 65/604* (2013.01); *H04L 65/4084* (2013.01); *H04L 67/42* (2013.01); *G06F 16/4387* (2019.01)

(58) Field of Classification Search
CPC ........... G06F 17/3053; G06F 17/30867; G06F 3/0482
See application file for complete search history.

(56) References Cited

U.S. PATENT DOCUMENTS 7,689,705 B1 3/2010 Lester et al.
9,756,091 B1 * 9/2017 Davies .................... H04L 65/40
2005/0108754 A1 5/2005 Carhart et al.
2008/0133696 A1 6/2008 Hanebeck
2009/0006321 A1 1/2009 Kaiser et al.
2011/0069936 A1 3/2011 Johnson et al.
2011/0200980 A1 * 8/2011 Takahashi ......... H04M 1/72586 434/365
2012/0245982 A1 9/2012 Daniel
(Continued)

OTHER PUBLICATIONS

International Search Report and Written Opinion dated Apr. 7, 2015, issued in connection with International Patent Application No. PCT/US2014/072821, filed on Dec. 30, 2014.
(Continued)

*Primary Examiner* — Tom Y Chang
(74) *Attorney, Agent, or Firm* — McDonnell Boehnen Hulbert & Berghoff LLP

(57) ABSTRACT

An example method involves (i) accessing a playlist defining a sequence of media content items including a first media content item and a second media content item; (ii) retrieving, from one or more server devices, first data representing the media content items of the received playlist, and using the retrieved first data to play out, via a client device, the media content items in accordance with the sequence defined by the playlist; (iii) accessing second data representing user activity related to the client device, and using the accessed second data as a basis to select a media content item from a plurality of media content items; and (iv) retrieving third data representing the selected media content item, and using the retrieved third data to play out, via the client device, the selected media content item in between playing out the first and second media content items.

17 Claims, 7 Drawing Sheets

100
102
Server
108
Communication Interface
110
Processor
112
Data Storage
114
106
Communication Network
104
Client
116
User Interface
118
Communication Interface
120
Processor
122
Data Storage
124

(56) References Cited

U.S. PATENT DOCUMENTS

2012/0259845 A1* 10/2012 Matejka ............ G06F 17/30528 707/723
2013/0159822 A1* 6/2013 Grossman ............... G06F 17/24 715/201
2014/0310596 A1* 10/2014 Lafreniere ............ G06F 3/0481 715/708
2014/0358898 A1* 12/2014 Lehtiniemi ....... G06F 17/30053 707/722

OTHER PUBLICATIONS

Printout of website relating to "Stitcher Radio for Podcasts" app, printed Mar. 4, 2014, 4 pages.
Printout of website relating to "Rivet News Radio" app, printed Mar. 4, 2014, 2 pages.
Printout of website relating to "Swell Radio for News and Podcasts" app, printed Mar. 4, 2014, 3 pages.
Printout of website relating to "Swell FAQs", printed Mar. 4, 2014, 6 pages.
Printout of webpage relating to Melissa Harris, "Pandora-like news radio app about to launch," dated Dec. 1, 2013, printed Jul. 7, 2014, 4 pages.

* cited by examiner

RETRIEVAL AND PLAYOUT OF MEDIA CONTENT

USAGE AND TERMINOLOGY

In this disclosure, unless otherwise specified and/or unless the particular context clearly dictates otherwise, each usage of “a” or “an” means at least one, and each usage of “the” means the at least one.

BACKGROUND

Unless otherwise indicated herein, the materials described in this section are not prior art to the claims in this disclosure and are not admitted to be prior art by inclusion in this section.

To listen to the radio, a listener typically tunes a receiver to a particular frequency (e.g., an AM or FM frequency) and listens to music, news, or other audible content being broadcast on that frequency by a radio station. The listener may tune the receiver, and therefore select a radio station, in a variety of ways, such as by rotating a dial, pushing a seek button, or pushing a station preset button. By selecting one of multiple radio stations, the listener may exert some control over the audible content presented to the listener. However, although the listener may control which station is selected, the listener is unlikely to have any influence over the audible content that gets broadcast by the selected station.

Typically, a radio station broadcasts the same audible content to multiple receivers, and therefore to multiple listeners, at the same time. Given this, it is common for a radio station to produce and broadcast audible content that is intended to appeal to a variety of different listeners. However, while some listeners may find such audible content appealing, other listeners may find it unappealing because it is not tailored to their particular interests.

SUMMARY

In one aspect, a method is disclosed. The method involves (i) accessing a playlist defining a sequence of media content items including a first media content item and a second media content item; (ii) retrieving, from one or more server devices, first data representing the media content items of the received playlist, and using the retrieved first data to play out, via a client device, the media content items in accordance with the sequence defined by the playlist; (iii) accessing second data representing user activity related to the client device, and using the accessed second data as a basis to select a media content item from a plurality of media content items; and (iv) retrieving third data representing the selected media content item, and using the retrieved third data to play out, via the client device, the selected media content item in between playing out the first and second media content items.

In another aspect, a non-transitory computer-readable medium is disclosed. The medium has stored thereon program instructions that when executed by a processor cause performance of a set of acts including: (i) accessing a playlist defining a sequence of media content items including a first media content item and a second media content item; (ii) retrieving, from one or more server devices, first data representing the media content items of the received playlist, and using the retrieved first data to play out, via a client device, the media content items in accordance with the sequence defined by the playlist; (iii) accessing second data representing user activity related to the client device, and using the accessed second data as a basis to select a media content item from a plurality of media content items; and (iv) retrieving third data representing the selected media content item, and using the retrieved third data to play out, via the client device, the selected media content item in between playing out the first and second media content items.

In yet another aspect, a method is disclosed. The method involves (i) accessing a playlist defining a sequence of media content items including a first media content item and a second media content item; (ii) accessing first data representing user activity related to a client device, and using the accessed first data as a basis to select a media content item from a plurality of media content items; and (iii) retrieving second data representing the selected media content item, and transmitting to the client device, the retrieved second data for playout of the selected media content item in between playout of the first and second media content items.

In still another aspect, a non-transitory computer-readable medium is disclosed. The medium has stored thereon program instructions that when executed by a processor cause performance of a set of acts including: (i) accessing a playlist defining a sequence of media content items including a first media content item and a second media content item; (ii) accessing first data representing user activity related to a client device, and using the accessed first data as a basis to select a media content item from a plurality of media content items; and (iii) retrieving second data representing the selected media content item, and transmitting to the client device, the retrieved second data for playout of the selected media content item in between playout of the first and second media content items.

These, as well as other aspects, advantages, and alternatives, will become apparent to those of ordinary skill in the art by reading the following detailed description, with reference where appropriate to the accompanying drawings.

DETAILED DESCRIPTION

I. Overview

Figure 1:
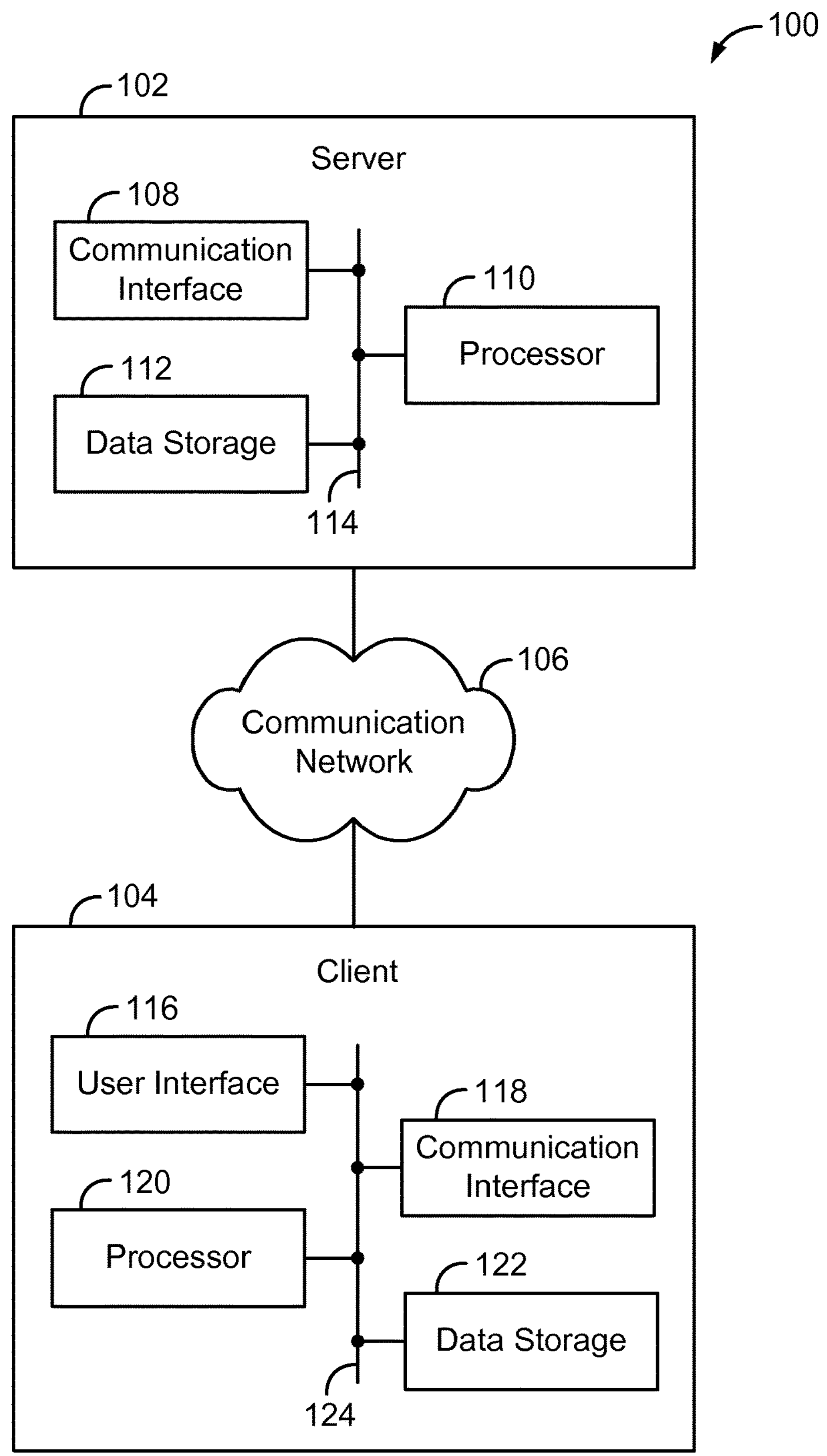
FIG. 1 is a simplified block diagram of an example system.

As indicated above, a radio station may produce and broadcast audible content that is intended to appeal to a variety of different listeners. For example, in the context of producing and broadcasting a news program, a narrator (such as a news anchor affiliated with the radio station, or another person) may read aloud news stories from each of a variety of different predetermined categories, such as sports, politics, and entertainment, and the audible readings may be included as part of the news program.

Although some listeners may be interested in audible versions of news stories from all of the predetermined categories, other listeners may have different interests. For example, one listener may be interested in sports and entertainment, but not politics, while another listener may be interested in politics and entertainment, but not sports. In either case, the listener may be presented with audible content that does not align with the listener's interests. As a result, the listener may find the news program unappealing.

One way to help address this issue is by implementing a system that provides a user with a personalized news program. In one example, such a system includes at least two computing devices, such as a server and a client, and a communication network through which the server and the client may communicate.

In this system, the server and the client may perform a variety of acts. For example, the server may determine a set of attributes associated with a user of the client and may use the determined set of attributes as a basis to generate a playlist of a personalized news program for the user. The generated playlist may define a sequence of media content items, each of which may include audio content, such as an audible version of a news story, and/or video content. An audible version of a news story may be referred to herein as an "audible news story." The generated playlist may also define media content attribute data respectively for each media content item, including for instance a reference to data representing the media content item and metadata characterizing the media content item. Collectively, this sequence of media content items may thus makeup a personalized news program.

After or as the server generates the playlist, the server may transmit the playlist to the client, and the client may traverse the entries of the playlist, retrieve data representing each referenced media content item, and use the data to play out each referenced media content item in accordance with the sequence defined by the playlist. In practice, for instance, for each media content item of the sequence, (i) the client may transmit to the server, or to another server for that matter, a request for data representing the media content item, (ii) the server may receive the transmitted request, (iii) responsive to the server receiving the transmitted request, the server may transmit to the client, the requested data, (iv) the client may receive the transmitted data, and (v) the client may play out for the user the media content item represented by the received data.

Optimally, this process may involve streaming of the data representing the media content items to the client and playout of the sequence of media content items in real time by the client. In particular, for each media content item referenced by the playlist, the client may request a server to stream the data representing the media content item to the client, and the client may then receive in response a data stream representing the requested media content item. As the client receives and buffers the requested data representing the media content items in sequence, the client may play out the represented media content items for a user, thus providing the user with a substantially continuous playout of the media content items that makeup the personalized news program.

In one example, a software application running on the client may facilitate one or more of the features described above. The software application may also facilitate other related features. For example, the software application may facilitate a feature whereby a user provides keywords or other input that are used to help generate a playlist for a personalized news program for that user. As another example, the software application may facilitate a feature whereby a user pauses playout of the news program, or perhaps skips playout of a particular media content item of the news program. In some instances, the software application may provide text-based instructions that a user can read to learn how to use such features.

According to the present disclosure, another way to provide these types of instructions to a user, is for the client to select and insert into the news program a media content item that provides an audible version of such instructions. A media content item of this type is referred to herein as a "media instruction item."

The client may select a particular media instruction item to use for this manner in a variety of ways. As one example, the client may access data representing user activity related to the software application, and the client may use the accessed data to select a media instruction item from a plurality of available media instruction items. This may allow the client to select a media instruction item based on the user's activity in connection with the software application. As such, if the user has already used a particular feature (suggesting that the user does not need instructions on how to use that feature), rather than selecting a media instruction item corresponding to that feature, the client may instead select a media instruction item that corresponds to a different feature, namely one that the user has not yet used.

As indicated above, once the client selects a particular media instruction item, the client may then insert the selected media instruction item into the news program. To illustrate this, consider a playlist that defines a sequence of media content items including a first media content item and a second media content item. Note that throughout this disclosure, any use of a numerical modifier (e.g., "first" or "second") does not imply a sequential order unless explicitly indicated. In this instance, the client may retrieve data representing the selected media instruction item and the client may use the retrieved data to play out the media instruction item in between playing out the first and second media content items.

This technique of selecting and inserting a media instruction into the news program may help provide a user with useful instructions in a manner that is easy for and appealing to the user.

II. Example System

FIG. 1 is a simplified block diagram of an example system 100 in which aspects of the present disclosure can be implemented. As shown, the system 100 includes at least two computing devices, namely a server 102 and a client 104, and a communication network 106. Generally, the server 102 and the client 104 are configured for communicating with each other via the communication network 106.

A. Server

The server 102 may be configured for performing a variety of functions or acts, such as those described in this disclosure (including the accompanying drawings). The server 102 may take a variety of forms and may include various components, including for example, a communication interface 108, a processor 110, and a data storage 112, all of which may be communicatively linked to each other via a system bus, network, or other connection mechanism 114.

The communication interface 108 may take a variety of forms and may be configured to allow the server 102 to communicate with one or more devices according to any number of protocols. For instance, the communication interface 108 may be configured to allow the server 102 to communicate with the client 104 via the communication network 106. In one example, the communication interface 108 may take the form of a wired interface, such as an Ethernet interface. As another example, the communication interface 108 may take the form of a wireless interface, such as a cellular or WI-FI interface.

The processor 110 may include a general purpose processor (e.g., a microprocessor) and/or a special purpose processor (e.g., a digital signal processors (DSP)).

The data storage 112 may include one or more volatile, non-volatile, removable, and/or non-removable storage components, such as magnetic, optical, or flash storage, and may be integrated in whole or in part with the processor 110. Further, the data storage 112 may take the form of a non-transitory computer-readable storage medium, having stored thereon program instructions (e.g., compiled or non-compiled program logic and/or machine code) that, when executed by the processor 110, cause the server 102 to perform one or more functions or acts, such as those described in this disclosure.

B. Client

Likewise, the client 104 may be configured for performing a variety of functions or acts such as those described in this disclosure. The client 104 may take a variety of forms, including for example, a mobile phone, tablet, laptop, media player, gaming device, wearable device, or vehicle. And the client 104 may include various components, including for example, a user interface 116, a communication interface 118, a processor 120, and a data storage 122, all of which may be communicatively linked with each other via a system bus, network, or other connection mechanism 124.

The user interface 116 may be configured for facilitating interaction between the client 104 and a user of the client 104, such as by receiving input from the user and providing output to the user. Thus, the user interface 116 may include input components such as a computer mouse, a keyboard, a touch-sensitive panel, or perhaps a microphone for receiving voice commands. In addition, the user interface 116 may include output components such as a display screen (which, for example, may be combined with a touch-sensitive panel) a sound speaker or other audio output mechanism, and a haptic feedback system. Furthermore, the user interface 116 may include a digital-analog conversion unit to facilitate playout of media content to a user. Moreover, the client 102 may provide output to the user via another user interface system (e.g., the client 102 may communicate with an audio output system via a short range wireless communication, such as a connection established in accordance with IEEE 802.15).

The communication interface 118 may take a variety of forms and may be configured to allow the client 104 to communicate with one or more devices according to any number of protocols. For instance, the communication interface 118 may be configured to allow the client 104 to communicate with the server 102 via the communication network 106. Further, the communication interface 118 may take the form of a wired or wireless interface.

The processor 120 may include a general purpose processor and/or a special purpose processor. The data storage 122 may include one or more volatile, non-volatile, removable, and/or non-removable storage components, and may be integrated in whole or in part with the processor 120. Further, the data storage 122 may take the form of a non-transitory computer-readable storage medium, having stored thereon program instructions that, when executed by the processor 120, cause the client 104 to perform one or more functions or acts, such as those described in this disclosure. Such program instructions may define or be part of a discrete software application, such a native app or web app, that can be executed upon user request for instance.

C. Communication Network

Generally, the communication network 106 may be configured to allow the server 102 and the client 104 to communicate with each other using any number of protocols. In addition, the communication network 106 may take a variety of forms, including for example a packet-switched network such as the Internet.

III. Example Operations

Methods of this disclosure will now be described principally in connection with providing a personalized news program to a user of the client 104. It will be understood, however, that this disclosure can extend to apply with respect to providing other types of media content as well, not necessarily limited to personalized news programs.

Figure 2:
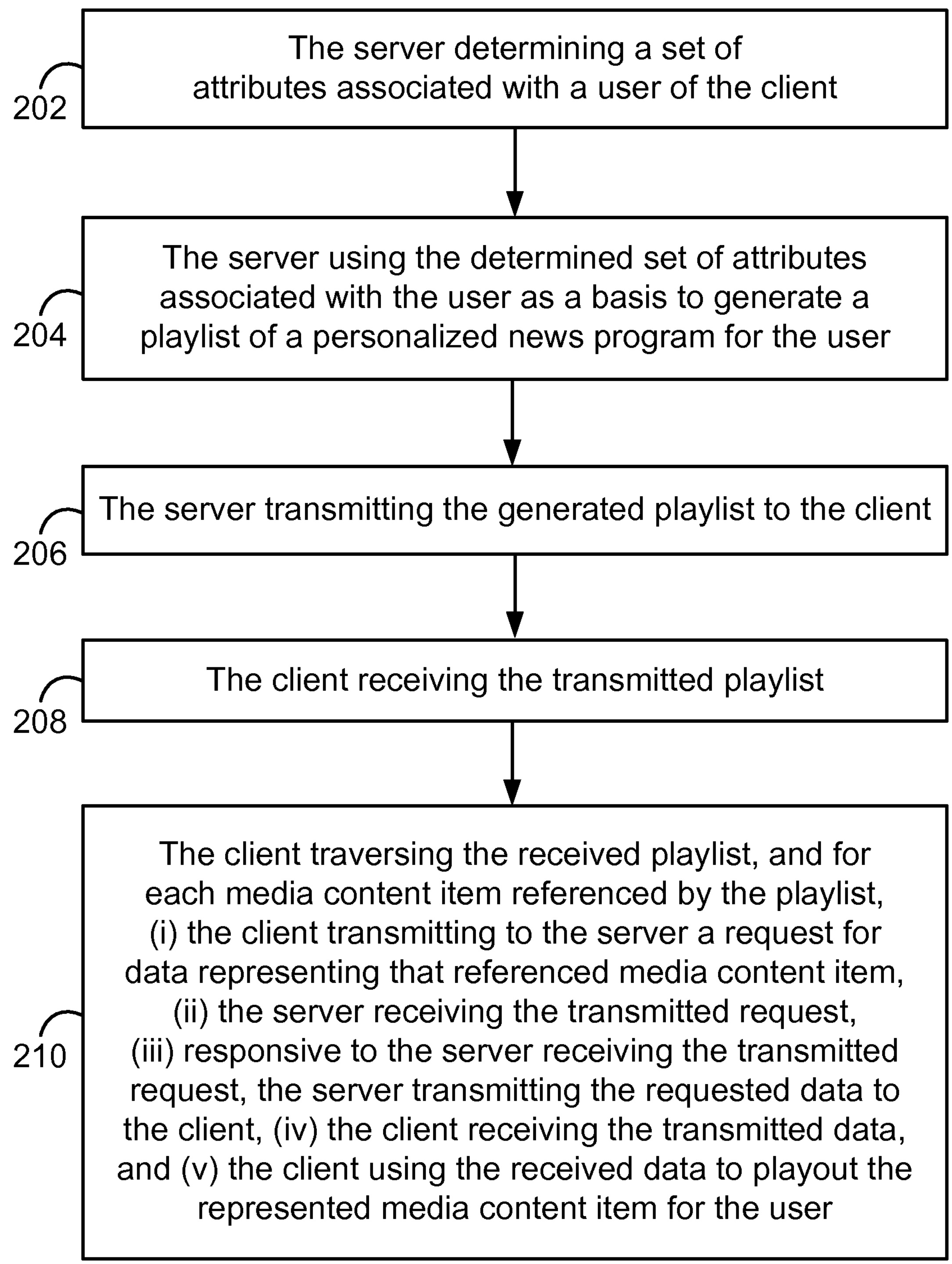
FIG. 2 is a flow chart depicting acts of an example method.

FIG. 2 is a flow chart depicting acts that can be carried out in an example method for providing a user of the client 104 with a personalized news program. At block 202, the method involves the server 102 determining a set of (i.e., one or more) attributes associated with a user of the client 104. At block 204, the method involves the server 102 using the determined set of attributes as a basis to generate a playlist of a personalized news program for the user. At block 206, the method involves the server 102 transmitting the generated playlist to the client 104, and at block 208, the method involves the client 104 receiving the transmitted playlist. At block 210, the method involves the client 104 traversing the received playlist, and for each media content item referenced by the playlist, (i) the client transmitting to the server a request for data representing that referenced media content item, (ii) the server receiving the transmitted request, (iii) responsive to the server receiving the transmitted request, the server transmitting the requested data to the client, (iv) the client receiving the transmitted data, and (v) the client using the received data to play out the represented media content item for the user.

In this process, each user-associated attribute that the server 102 determines may take various forms. By way of example, each attribute may relate to one or more of the following: the user's extent of interest in a particular type of news story, the user's interest in a particular type of audible news story, whether the user has a subscription to a news-related product or service (e.g., a newspaper subscription), the user's age, the user's gender, the user's current location, the user's destined location (e.g., a location to which the user is driving), the weather at the user's current location, the weather at the user's destined location, and the user's estimated travel time between the user's current location and the user's destined location.

Further, the act of the server 102 determining the set of attributes associated with the user may take various forms. In one example implementation, for instance, the server 102 may receive from the client 104 an identification of the user of the client 104, and the server 102 may then refer to one or more data sources that correlate or facilitate correlation of that identification with an attribute, so as to determine an attribute associated with the user.

In another example implementation, the client 104 may determine a user-associated attribute and may report the determined attribute to the server 102, in which case the server would determine the user-associated attribute by receiving the reported attribute from the client 104. To facilitate this, the client 104 may provide a configuration interface through which the user can manually enter or select a user-associated attribute, and the client 104 may thus determine the user-associated attribute by receiving user indications of the user-associated attribute through that interface. Alternatively or additionally, the client 104 may determine a user-associated attribute by evaluating information associated with the user, such as user profile records, browsing history, shopping history, location history, and the like. Other examples are possible as well.

For this purpose, the client 104 may determine the attribute associated with the user in a variety of ways. As one example, the client 104 may receive the attribute as input from the user. As another example, the client 104 may receive other input from the user, and the client 104 may use the input as a basis to determine the attribute. For instance, the client 104 may receive input from the user, such as the user's destined location, and the client 104 may use a positioning device and a navigation software application to determine the user's estimated travel time from the user's current location to the user's destined location. In some instances, the client may communicate with the server 102 or another server, such as a server affiliated with the mapping application, to determine such an attribute. Other example techniques for determining an attribute associated with a user are possible as well.

The server 102 may then use the determined set of attributes associated with the user in various ways to generate the playlist of the personalized news program for the user. For instance, based on the set of user-associated attributes, the server 102 may select particular audible news stories or types of audible news stories to specify as media content items in the playlist. As such, the server 102 may be configured with data that maps particular sets of user-associated attributes with particular types of audible news stories, possibly giving more weight to inclusion of certain types of audible news stories than to other types of audible news stories. For example, the data may indicate that a particular set of user-associated attributes suggests more likely user interest in entertainment news than in politics news, in which case the server 102 may structure the playlist to specify a greater extent of entertainment-related audible news stories than politics-related audible news stories. As another example, the data may indicate that a particular set of user-associated attributes suggests great user interest in sports, in which case the server 102 may structure the playlist to specify a relatively great extent of sports-related audible news stories.

In some examples, an audible news story's type may be defined by a set of attributes associated with the audible news story, examples of which may include or relate to one or more of the following: the audible news story's content category, the audible news story's target demographic (e.g., by age, gender, or location), the audible news story's creation date, the audible news story's author or other attribution information, the extent of popularity of the audible news story, the extent of popularity of a person or topic related to the audible news story, or the manner in which data representing the audible news story was generated.

These attributes may be stored in a variety of ways. For example, they may be stored as metadata along with the data representing the audible news story to which they correspond. These attributes may also be set in a variety of different ways, such as by a user via a user interface.

As indicated above, a media content item such as an audible news story may be represented by data. This data may be generated in a variety of ways. For example, the server 102 may generate data representing an audible news story by recording a narrator reading aloud a text-based version of the news story, or by using a well-known text-to-speech (TTS) software and/or hardware system to convert data representing a text-based version of a news story into data representing an audible version of the news story. Further, data representing a media content item may be stored in a variety of ways. For example, the data may be stored in the form of a digital audio file in a data storage, such as the data storage 112.

In one implementation, the act of the server 102 using the determined set of attributes associated with the user as a basis to generate a playlist of a personalized news program for the user may involve the server 102 (i) using the determined set of attributes associated with the user as a basis to select a playlist template from a group of templates (e.g., stored in the data storage 112), (ii) using the selected playlist template as a basis to select a set of audible news stories from a group of audible news stories (e.g., stored in the data storage 112), and (iii) generating a playlist that includes references to each audible news story from the selected set of audible news stories.

Generally, a playlist template serves as an outline for a playlist and may define a sequence of placeholders for media content attribute data. For each of these placeholders, the playlist template may further specify placeholder attribute data. Based on this placeholder attribute data, the server 102 may select a set of audible news stories, and replace that placeholder with media content attribute data for the selected set of audible news stories, thereby converting the playlist template into a playlist.

There may be a variety of different types of placeholder attribute data, examples of which may include a quantity tag and a type tag. A quantity tag specifies a quantity of audible news stories that the server 102 should select for the corresponding placeholder. And the type tag specifies the particular types of audible news stories that the server 102 should select for the corresponding placeholder.

In line with the discussion above, the playlist that the server 102 generates may define an ordered sequence of entries, each of which provides media content attribute data regarding a respective media content item, such as a particular audible news story. In practice, the playlist may provide this information in various ways, such as with use of extensible markup language (XML) for instance, in a manner that the client 104 would be configured to read.

For a given media content item, the media content attribute data may include a reference to the data representing the media content item, such as a network address or content identifier that the client 104 can read and use as a basis to request and receive the data representing the media content item for playout of the represented media content item. Thus, the client 104 may read the reference indicated for a given media content item to determine a network address or the like from which to obtain the data representing the media content item, and the client 104 may request and receive the data representing the media content item from that network address or by otherwise using the indicated reference.

Such a reference may have various levels of granularity. By way of example, the reference may be specific to data representing a particular audible news story, by specifying a particular story identifier or name of a news story media file for instance, in which case the client 104 could request the server 102 to transmit that data representing that particular audible news story and the server 102 could retrieve that data representing that particular audible news story from data storage and transmit it to the client 104. And as another example, the reference may be more general, specifying a class of news story, such as "sports" or "politics" for instance, in which case the client 104 could request the server 102 to transmit data representing an audible news story of that class generally, and the server 102 may then retrieve data representing a latest or most pertinent audible news story of that class and transmit it to the client 104. Further, any or all of these references may refer to locations other than server 102, such as to one or more other servers for instance.

Further, the server 102 may transmit the generated playlist to the client 104, and the client 104 may receive the generated playlist, in various ways. By way of example, the client 104 may transmit to the server 102 a hypertext transfer protocol (HTTP) request or the like seeking the playlist, and the server 102 may respond by generating the playlist and transmitting the playlist to the client 104 in an HTTP response or the like.

Continuing with reference to FIG. 2, as noted above, at block 210, the method involves the client 104 traversing the received playlist, and for each media content item of the sequence, (i) the client transmitting to the server, a request for data representing the media content item, (ii) the server receiving the transmitted request, (iii) responsive to the server receiving the transmitted request, the server transmitting to the client, the requested data, (iv) the client receiving the transmitted data, and (v) the client using the received data to playout the represented media content item for the user.

As further noted above, this process may involve streaming of the data representing the media content item from the server 102, or from one or more other servers, to the client 104. In practice, for instance, as the client 104 traverses the playlist, the client 104 may read each successive entry to determine the reference that the entry specifies for a media content item, and the client may transmit to the server 102 a request for the server 102 to stream the data representing that media content item to the client 104. To facilitate this, the client 104 may engage in signaling with the server 102 in accordance with the Real Time Streaming Protocol (RTSP), to establish a streaming media session and to specify the data representing the media content to be streamed, and the server 102 may stream the requested data to the client 104 in accordance with the Real-time Transport Protocol (RTP). As the client 104 receives this streamed data, the client 104 may then buffer and play out the content represented by the data in real time, providing the user with substantially continuous playout of the news program.

Figure 3:
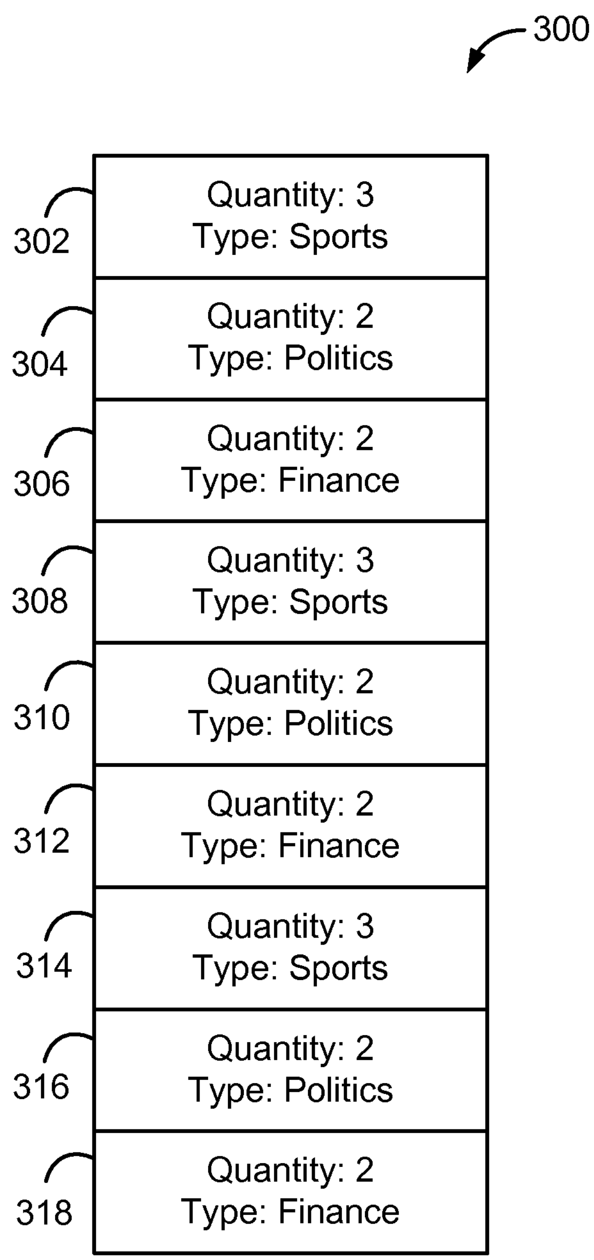
FIG. 3 is a diagram of an example playlist template.

To help appreciate operation of this process, FIG. 3 shows an example playlist template 300. The template 300 includes nine ordered entries 302, 304, 306, 308, 310, 312, 314, 316, and 318. Each of the entries serves as a placeholder for media content attribute data. And each of those entries includes placeholder attribute data, namely a quantity tag and a type tag. For example, the entry 302 includes a quantity tag that specifies "3" and a type tag that specifies a "Sports" content category type. As another example, the entry 304 includes a quantity tag that specifies "2" and a type tag that specifies a "Politics" content category type.

As indicated above in connection with block 204, the method may involve the server 102 using the selected playlist template as a basis to select a set of audible news stories from a group of audible news stories. This may involve, for each entry that serves as a placeholder of media content attribute data, the server 102 using the quantity and type tags of that entry as a basis to select a set of audible news stories. For example, for the entry 302, the server 102 may select a set of three audible news stories that are all associated with a "sports" content category attribute. As another example, for the entry 304, the server 102 may select a set of two audible news stories that are all associated with a "politics" content category attribute.

Additionally or alternatively, the server 102 may determine an attribute associated with an audible news story, and the server 102 may use the determined attribute as a basis to select the set of audible news stories from the group of audible news stories.

Also, as indicated above in connection with block 204, the method may involve generating a playlist that includes references to each audible news story from the selected set of audible news stories. This may involve the server 102 replacing placeholders of the playlist template with data representing the corresponding selected sets of audible news stories, and thereby generating a playlist by "converting" the playlist template into a playlist.

Figure 4:
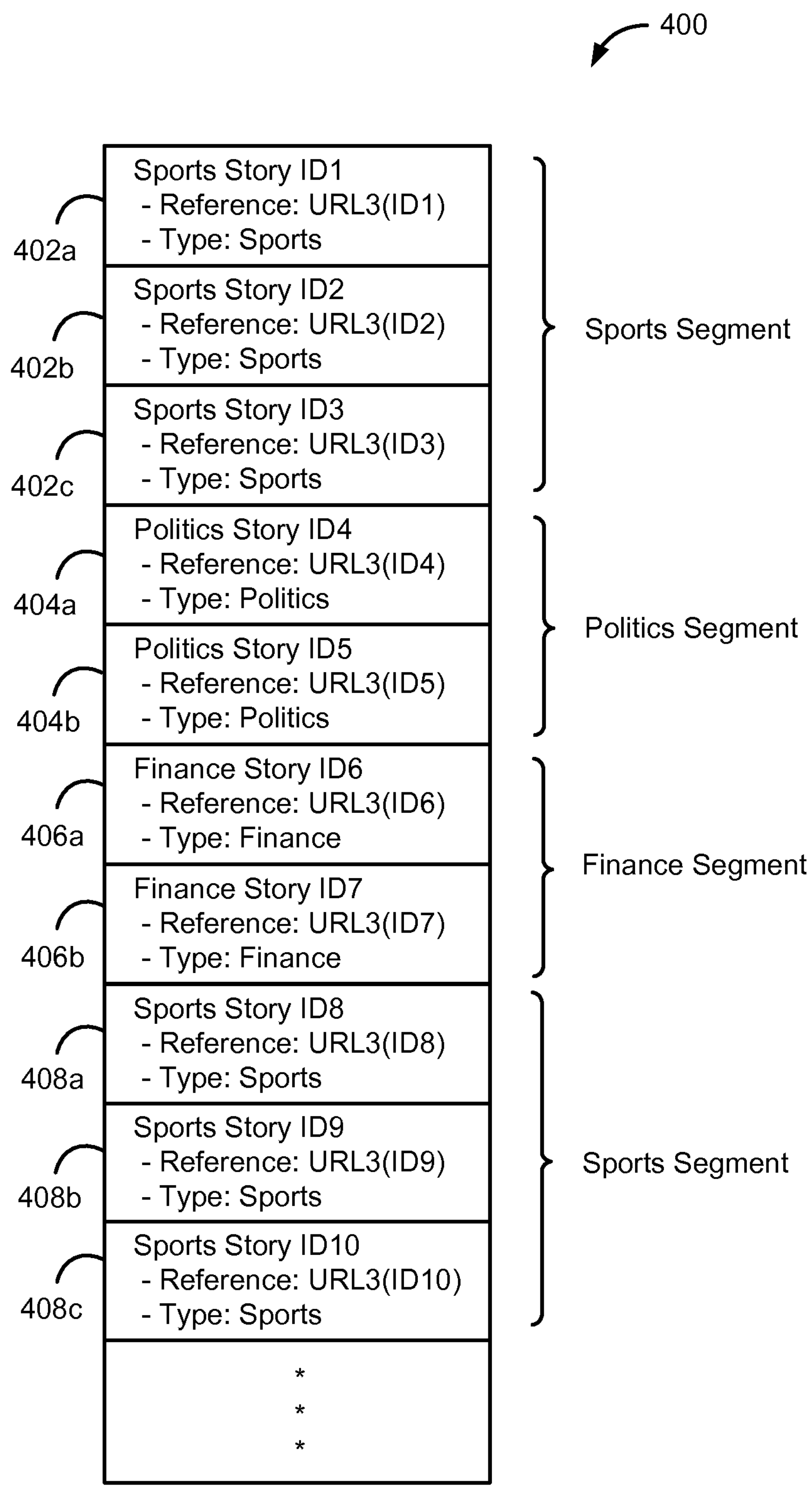
FIG. 4 is a diagram of an example playlist.

FIG. 4 shows a portion of an example playlist 400 that the server 102 may generate after the server 102 selects the playlist template 300. As shown, the generated playlist 400 include entries 402*a-c*, 404*a-b*, 406*a-b*, and 408*a-c*, each of which is for a respective audible news story and designates a respective reference and content category type. For example, entry 402*a* designates a "Sports Story ID1," with a reference in the form of "URL3" that may point to the server 102 and that designates "ID1" as a query parameter or the like, and with a content category type indication of "Sports." Entry 402*b* then designates a "Sports Story ID2," with a reference in the form of "URL3" that may point to the server 102 and that designates "ID2" as a query parameter, and with a content category type indication of "Sports." And entry 402*c* designates a "Sports Story ID3," with a reference in the form of "URL3" that may point to the server 102 and that designates "ID3" as a query parameter, and with a content category type indication of "Sports." As shown, this portion of the playlist 400 may be referred to as the "Sports Segment."

As another example, entry 404*a* designates a "Politics Story ID4," with a reference in the form of "URL3" that may point to the server 102 and that designates "ID4" as a query parameter, and with a content category type indication of "Politics." And entry 404*b* designates a "Politics Story ID5," with a reference in the form of "URL3" that may point to the server 102 and that designates "ID5" as a query parameter, and with a content category type indication of "Politics." As shown, this portion of the playlist 400 may be referred to as the "Politics Segment."

For brevity, FIG. 4 does not show additional entries after 408*c*, but it should be apparent that the server 102 may generate the remainder of the playlist 400 using the techniques described above.

Upon receipt of the playlist 400 from the server 102, the client 104 may traverse the entries and, one by one, request streaming of the referenced media content items from the server 102, or one or more other servers, and may receive and play out the requested media content items in the specified sequence, thereby playing out the news program.

Figure 5:
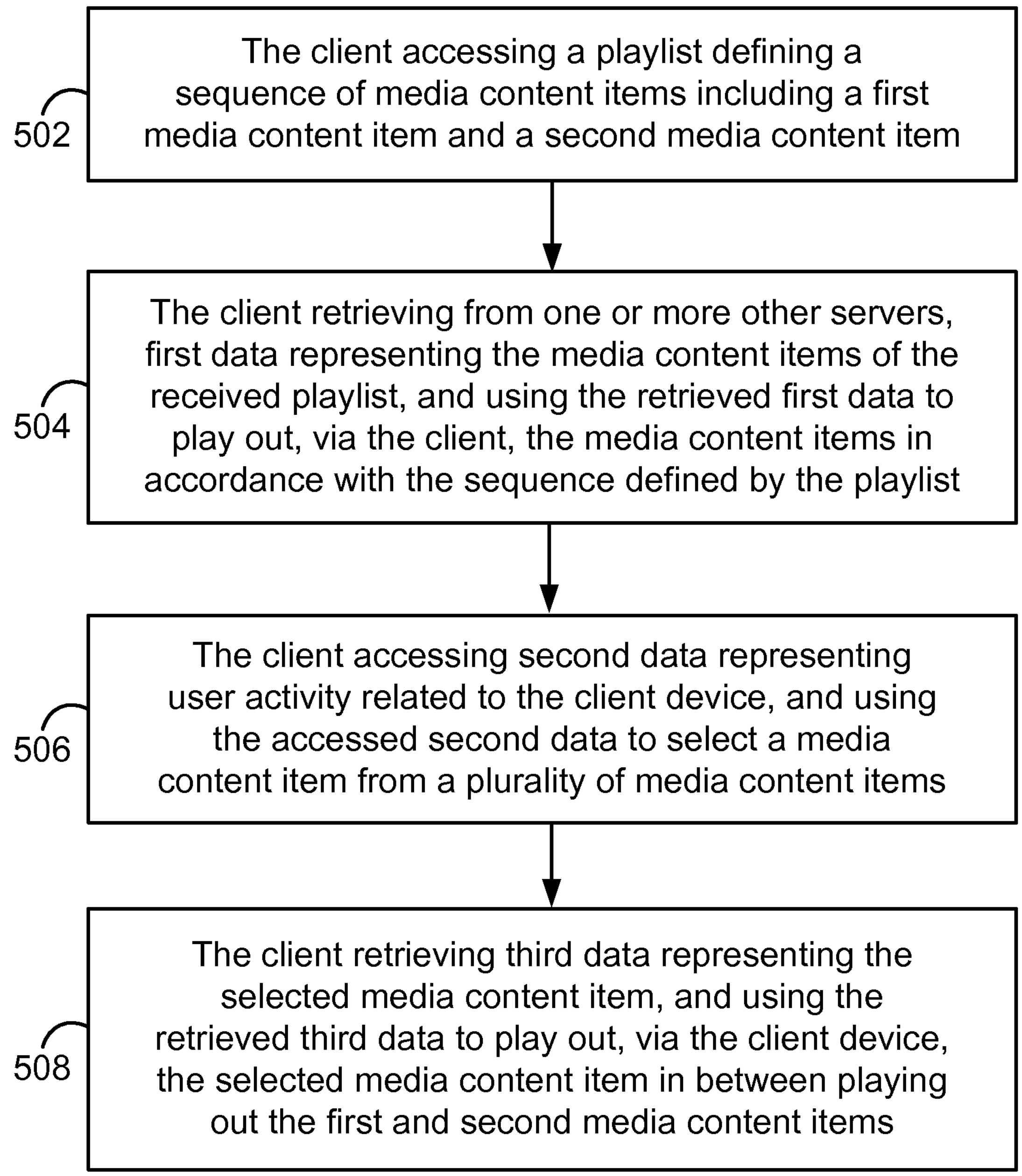
FIG. 5 is a flow chart depicting acts of another example method.

As noted above, in some examples, the client 104 may select and insert into a news program a media instruction item. FIG. 5 is a flow chart depicting acts that can be carried out in an example method related to this feature.

At block 502, the method involves the client 104 accessing a playlist defining a sequence of media content items including a first media content item and a second media content item. In one example, the server 102 may transmit the playlist to the client 104. In such a case, the client 104 accessing the playlist may involve the client 104 receiving the playlist from the server 102. Also, in one example, the first and second media content items may be sequentially adjacent as defined by the playlist.

At block 504, the method involves the client 104 retrieving from one or more servers (e.g., the server 102), first data representing the media content items of the received playlist, and using the retrieved first data to play out, via the client 104, the media content items in accordance with the sequence defined by the playlist.

At block 506, the method involves the client 104 accessing second data representing user activity related to the client device, and using the accessed second data as a basis to select a media content item from a plurality of media content items.

In one example, the client 104 may monitor a user's interactions via the user interface 116, and may use the monitored interactions to generate the second data. The client 104 may then store the second data in the data storage 122, for instance. The user activity related to the client device may take a variety of forms. In one example, such user activity may take the form of input related to a software application running on the client 104. Such input may indicate, among other things, which features facilitated by the software application the user has used.

The plurality of media content items, and therefore the selected media content item, may also take a variety of forms. For example, the media content items in the plurality may take the form of media instruction items, perhaps with each media instruction item corresponding to a respective feature facilitated by the software application.

As such, the client 104 may select a media instruction item based on the user's activity in connection with the software application. As one example, if the user has already used a particular feature (suggesting that the user does not need instructions on how to use that feature), rather than selecting a media instruction item corresponding to that feature, the client 104 may instead select media instruction item that corresponds to a different feature that the user has not yet used.

Accordingly, in one example, the act of the client 104 using the accessed second data as a basis to select a media content item from a plurality of media content items may involve the client 104 using the accessed second data to select, from a plurality of media content items, a media instruction content item that, based on the user activity, has not been used by a user corresponding to the user activity.

At block 508, the method involves the client 104 retrieving third data representing the selected media content item, and using the retrieved third data to play out, via the client 104, the selected media content item in between playing out the first and second media content items. The client 104 may retrieve the third data from the server 102 or the client 104, for instance.

In one example, the client 104 may make a determination of whether a condition has been satisfied, and the client 104 may perform the act at block 508 responsive to making the determination that the condition has been satisfied. The condition may take a variety of forms and may be a complex condition that includes multiple sub-conditions. For example, a condition A may be that both condition B and condition C are satisfied. As another example, a condition D may be that either condition E or condition F is satisfied. Other examples are possible as well.

In one example, a condition (or sub-condition) may be that a separation between the first and second media content items is in a particular position with respect to the sequence defined by the playlist. As another example, a condition may be that the client 104 has played out media content items of the playlist for a threshold duration (e.g., for at least ten minutes). As another example, a condition may be that a threshold duration has passed since a media content item of a particular type has been played out in connection with a separation in between the first and second media content items. As yet another example, a condition may be that a threshold number of media content items of a particular type (e.g., media instruction items) have been played out in connection with a separation in between media content items of the playlist. As yet another example, a condition may be that a particular time is within a particular time period range.

Figure 6:
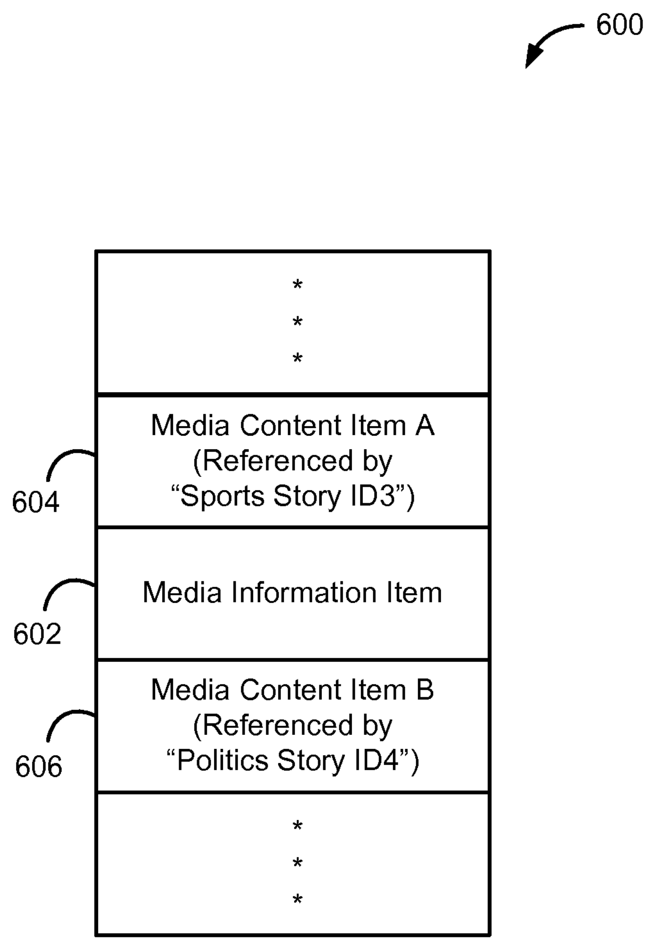
FIG. 6 is a diagram of an example news program.

FIG. 6 helps illustrate the result of the client 104 inserting a media content item into a news program 600 based on the playlist 400 as discussed above. In particular, FIG. 6 illustrates an example in which the client 104 inserts a media instruction item 602 in between a media content item A 604 (referenced by "Sport Story ID3") and media content item B 606 (referenced by "Politics Story ID4").

Figure 7:
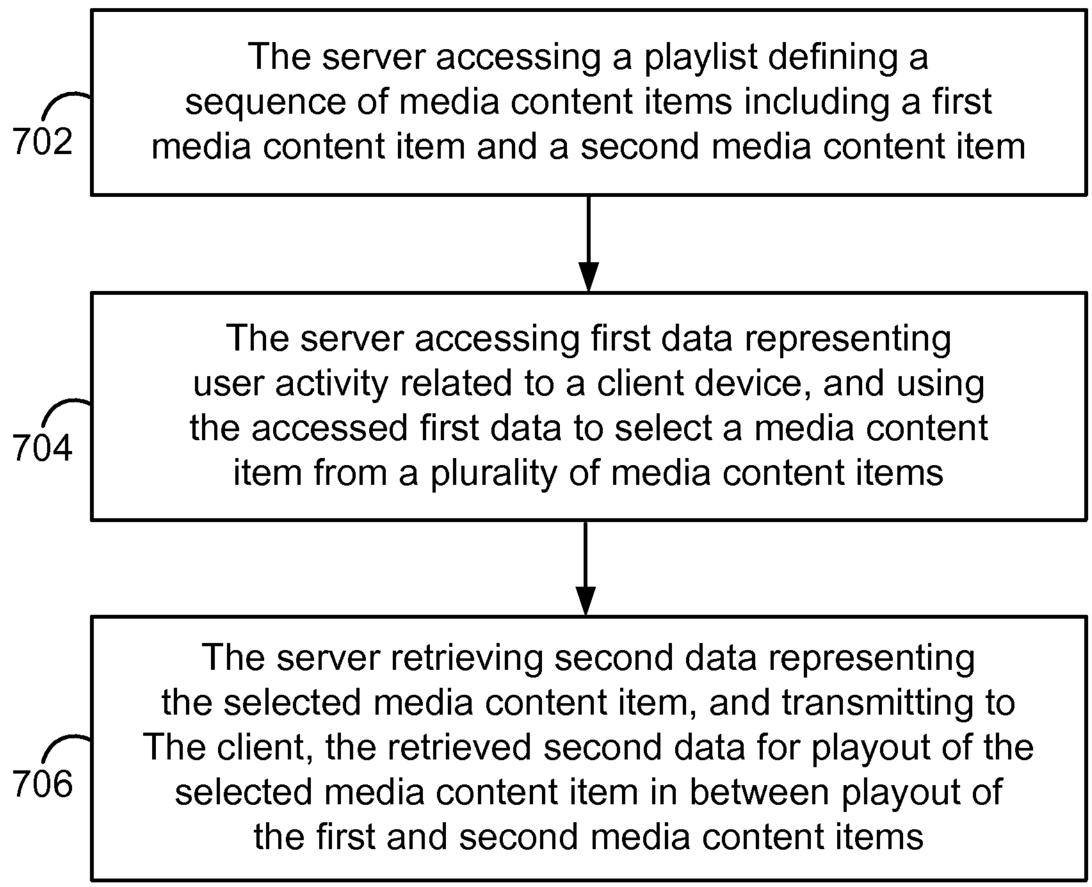
FIG. 7 is a flow chart depicting acts of another example method.

In some examples, the server 102 may select the media content item and transmit it to the client 104 for insertion into the news program. FIG. 7 is a flow chart depicting acts that can be carried out in an example method related to this feature.

At block 702, the method involves the server 102 accessing a playlist defining a sequence of media content items including a first media content item and a second media content item.

At block 704, the method involves the server 102 accessing first data representing user activity related to the client 104, and using the accessed first data to select a media content item from a plurality of media content items. In one example, the client 104 may transmit the first data to the client 104. In this case, the server 102 accessing the first data may involve the server 102 receiving the first data from the client 104.

At block 706, the method involves the server 102 retrieving second data representing the selected media content item, and transmitting to the client 104, the retrieved second data for playout of the selected media content item in between playout of the first and second media content items.

In one example, the server 104 may make a determination of whether a condition has been satisfied, and the server 104 may perform the act at block 706 responsive to making the determination that the condition has been satisfied. These conditions may have one or more of the properties of the conditions described above.

IV. Example Variations

The variations described in connection with select examples of the disclosed system and method may be applied to all other examples of the disclosed system and method.

Further, while one or more acts have been described as being performed by or otherwise related to certain devices or entities (e.g., the server 102 or the client 104), the acts may be performed by or otherwise related to any device or entity. As such, any function that has been described as being performed by the server 102 could alternatively be performed by a different server or by the client 104.

Further, the acts need not be performed in the disclosed order, although in some examples, an order may be preferred. Also, not all acts need to be performed to achieve the desired advantages of the disclosed system and method, and therefore not all acts are required.

Also, while the disclosed methods have been described principally in connection with providing a personalized news program, the methods may be applied in connection with other applications or environments.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A method comprising:

accessing a playlist defining a sequence of media content items including a first media content item and a second media content item;

retrieving, from one or more server devices, first data representing the media content items of the accessed playlist, and using the retrieved first data to play out, via a client device, the media content items in accordance with the sequence defined by the playlist;

accessing second data representing user activity related to the client device, and using the accessed second data as a basis to select a media content item from a plurality of media content items, wherein the user activity comprises user input indicating whether a user has used a particular feature provided by a software application of the client device, wherein the particular feature is a feature other than a request to play out media content, and wherein the selected media content item includes content that provides instructions on how to use the particular feature; and retrieving third data representing the selected media content item, and using the retrieved third data to play out, via the client device, the selected media content item in between playing out the first and second media content items.

2. The method of claim 1, wherein the selected media content item comprises audible content that provides instructions on how to use the particular feature of the software application running on the client device.

3. The method of claim 1, wherein using the accessed second data as a basis to select a media content item from a plurality of media content items comprises using the accessed second data as a basis to select, from a plurality of media content items, a media content that provides instructions on how to use the particular feature (i) of the software application running on the client device (ii) that, based on the user activity, has not been used by a user corresponding to the user activity.

4. The method of claim 1, further comprising:

making a determination of whether a condition has been satisfied, and wherein retrieving third data representing the selected media content item, and using the retrieved third data to play out, via the client device, the selected media content item in between playing out the first and second media content items, occurs responsive to making the determination that the condition has been satisfied.

5. The method of claim 4, wherein the condition comprises a condition that a separation between the first and second media content items is in a particular position with respect to the sequence defined by the playlist.

6. The method of claim 4, wherein the condition comprises a condition that a threshold duration has passed since a media content item of a particular content category has been played out in connection with a separation between media content items of the playlist.

7. A non-transitory computer-readable medium having stored thereon program instructions that when executed by a processor cause performance of a set of acts comprising:

accessing a playlist defining a sequence of media content items including a first media content item and a second media content item;

retrieving, from one or more server devices, first data representing the media content items of the accessed playlist, and using the retrieved first data to play out, via a client device, the media content items in accordance with the sequence defined by the playlist;

accessing second data representing user activity related to the client device, and using the accessed second data as a basis to select a media content item from a plurality of media content items, wherein the user activity comprises user input indicating whether a user has used a particular feature provided by a software application of the client device, wherein the particular feature is a feature other than a request to play out media content, and wherein the selected media content item includes content that provides instructions on how to use the particular feature; and retrieving third data representing the selected media content item, and using the retrieved third data to play out, via the client device, the selected media content item in between playing out the first and second media content items.

8. The non-transitory computer-readable medium of claim 7, wherein the selected media content item comprises audible content that provides instructions on how to use the particular feature of the software application running on the client device.

9. The non-transitory computer-readable medium of claim 7, wherein using the accessed second data as a basis to select a media content item from a plurality of media content items comprises using the accessed second data to select, from a plurality of media content items, a media content that provides instructions on how to use the particular feature (i) of the software application running on the client device (ii) that, based on the user activity, has not been used by a user corresponding to the user activity.

10. The non-transitory computer-readable medium of claim 7, the set of acts further comprising:

making a determination of whether a condition has been satisfied, and wherein retrieving third data representing the selected media content item, and using the retrieved third data to play out, via the client device, the selected media content item in between playing out the first and second media content items, occurs responsive to making the determination that the condition has been satisfied.

11. The non-transitory computer-readable medium of claim 10, wherein the condition comprises a condition that a separation between the first and second media content items is in a particular position with respect to the sequence defined by the playlist.

12. The non-transitory computer-readable medium of claim 10, wherein the condition comprises a condition that a threshold duration has passed since a media content item of a particular content category has been played out in connection with a separation between media content items of the playlist.

13. A method comprising:

accessing a playlist defining a sequence of media content items including a first media content item and a second media content item;

accessing first data representing user activity related to a client device, and using the accessed first data to select a media content item from a plurality of media content items, wherein the user activity comprises user input indicating whether a user has used a particular feature provided by a software application of the client device, wherein the particular feature is a feature other than a request to play out media content, and wherein the selected media content item includes content that provides instructions on how to use the particular feature; and retrieving second data representing the selected media content item, and transmitting to the client device, the retrieved second data for playout of the selected media content item in between playout of the first and second media content items.

14. The method of claim 13, wherein the selected media content item comprises audible content that provides instructions on how to use the particular feature of the software application running on the client device.

15. The method of claim 13, wherein using the accessed first data to select a media content item from a plurality of media content items comprises using the accessed first data to select, from a plurality of media content items, a media content that provides instructions on how to use the particular feature (i) of the software application running on the client device (ii) that, based on the user activity, has not been used by a user corresponding to the user activity.

16. The method of claim 13, further comprising:

making a determination of whether a condition has been satisfied, and wherein retrieving second data representing the selected media content item, and transmitting to the client device, the retrieved second data for playout of the selected media content item in between playout of the first and second media content items, occurs responsive to making the determination that the condition has been satisfied.

17. The method of claim 16, wherein the condition comprises a condition that a separation between the first and second media content items is in a particular position with respect to the sequence defined by the playlist.

* * * * *